US012621554B2

(12) United States Patent
Shim et al.

(10) Patent No.: US 12,621,554 B2
(45) Date of Patent: May 5, 2026

(54) WELDING INSPECTION APPARATUS FOR INSPECTING A BATTERY CAN

(71) Applicant: LG ENERGY SOLUTION, LTD., Seoul (KR)

(72) Inventors: Kyuhun Shim, Daejeon (KR); Gilyoung Lee, Daejeon (KR); Junoh Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 79 days.

(21) Appl. No.: 18/708,023

(22) PCT Filed: Nov. 8, 2022

(86) PCT No.: PCT/KR2022/017417
§ 371 (c)(1),
(2) Date: May 7, 2024

(87) PCT Pub. No.: WO2023/080756
PCT Pub. Date: May 11, 2023

(65) Prior Publication Data
US 2025/0024130 A1     Jan. 16, 2025

(30) Foreign Application Priority Data

Nov. 8, 2021     (KR) ........................ 10-2021-0152638
May 3, 2022     (KR) ........................ 10-2022-0055065

(51) Int. Cl.
*H04N 23/50*          (2023.01)
*B23K 31/12*          (2006.01)
          (Continued)

(52) U.S. Cl.
CPC ......... *H04N 23/555* (2023.01); *B23K 31/125* (2013.01); *G02B 23/2461* (2013.01);
          (Continued)

(58) Field of Classification Search
CPC .... H04N 23/555; H04N 23/56; B23K 31/125; B23K 2101/36; B23K 31/12;
          (Continued)

(56) References Cited

U.S. PATENT DOCUMENTS 4,753,224 A       6/1988   Tojo
12,179,290 B2 *  12/2024   Kim ..................... B23K 31/125
          (Continued)

FOREIGN PATENT DOCUMENTS

CN          105428695 A       3/2016
CN          106825958 A       6/2017
          (Continued)

OTHER PUBLICATIONS

Japanese Office Action for Japanese Application No. 2024-527221, dated Jun. 17, 2025, with English translation.
          (Continued)

*Primary Examiner* — Richard A Hansell, Jr.
(74) *Attorney, Agent, or Firm* — Birch, Stewart, Kolasch & Birch, LLP

(57)          ABSTRACT

A welding inspection apparatus and a welding inspection method in which in a tab-less cylindrical battery cell having a jelly roll-type electrode assembly, a current collection plate welded to an uncoated part of the electrode assembly is welded to an electrode terminal that is fixed in a way that penetrates a closed surface provided in one end portion of a cylindrical battery can which accommodates the electrode assembly, from the inside of a hollow hole part of the electrode assembly, to see a welding state. The battery can is fixed by a jig, and the welding inspection apparatus, as a vision camera inspection apparatus with an endoscope part or a telephoto lens, photographs a welding portion and the inner surface of the hollow hole part, to see failure caused by weak welding, over welding or weld spatter.

17 Claims, 6 Drawing Sheets

(51) Int. Cl.

| | | |
|---|---|---|
| *B23K 101/36* | (2006.01) |
| *G02B 23/24* | (2006.01) |
| *G06T 7/00* | (2017.01) |
| *H01M 10/42* | (2006.01) |
| *H01M 50/566* | (2021.01) |
| *H04N 23/56* | (2023.01) |

(52) U.S. Cl.
CPC ....... *G06T 7/0004* (2013.01); *H01M 10/4285* (2013.01); *H01M 50/566* (2021.01); *H04N 23/56* (2023.01); *B23K 2101/36* (2018.08); *G06T 2207/10068* (2013.01)

(58) Field of Classification Search
CPC .............. G02B 23/2461; G06T 7/0004; G06T 2207/10068; H01M 10/4285; H01M 50/566; G01N 2021/8887; G01N 2021/9544; G01N 21/952; G01N 21/954; G01N 21/88; Y02P 70/50; Y02E 60/10
See application file for complete search history.

(56) References Cited

U.S. PATENT DOCUMENTS

| | | | | |
|---|---|---|---|---|
| 2007/0203396 A1* | 8/2007 | McCutcheon | ..... | A61B 1/00148 |
| | | | | 600/173 |
| 2009/0111017 A1* | 4/2009 | Kim | .................... | H01M 50/171 |
| | | | | 429/185 |
| 2011/0296923 A1* | 12/2011 | Cataldo | ................ | G01N 29/262 |
| | | | | 73/632 |
| 2014/0081126 A1* | 3/2014 | Kim | ..................... | A61B 5/0084 |
| | | | | 600/424 |
| 2020/0242753 A1* | 7/2020 | Shibata | ................ | B23K 26/323 |
| 2021/0252638 A1* | 8/2021 | Roh | ....................... | B23K 26/26 |

FOREIGN PATENT DOCUMENTS

| | | | | | |
|---|---|---|---|---|---|
| CN | 109613012 A | | 4/2019 | |
| CN | 109738454 A | | 5/2019 | |
| CN | 209559779 U | | 10/2019 | |
| JP | 6-31461 A | | 2/1994 | |
| JP | 6-67096 A | | 8/1994 | |
| JP | 9-330695 A | | 12/1997 | |
| JP | 2000-221016 A | | 8/2000 | |
| JP | 2001-49834 A | | 2/2001 | |
| JP | 2001043834 A | * | 2/2001 | |
| JP | 2001-332308 A | | 11/2001 | |
| JP | 2008-185958 A | | 8/2008 | |
| JP | 2011133288 A | * | 7/2011 | |
| KR | 10-0165608 B1 | | 1/1999 | |
| KR | 10-1012654 B1 | | 2/2011 | |
| KR | 10-1287464 B1 | | 7/2013 | |
| KR | 10-2018-0035484 A | | 4/2018 | |
| KR | 20180035484 A | * | 4/2018 | ........ H01M 10/0422 |
| KR | 10-2019-0013014 A | | 2/2019 | |
| KR | 10-2227538 B1 | | 3/2021 | |
| KR | 10-2294189 B1 | | 8/2021 | |

OTHER PUBLICATIONS

Extended European Search Report for European Application No. 22890487.6, dated Jan. 8, 2025.

Ota M et al., "Development of Appearance Inspection System for Root Pass Welds of Small-Calibre Pipes by Image Composition Technique," Welding International, vol. 13, No. 7, 1999, XP-000847345, pp. 544-550.

International Search Report (PCT/ISA/210) issued in PCT/KR2022/017417, dated Feb. 22, 2023.

\* cited by examiner

【FIG. 1】
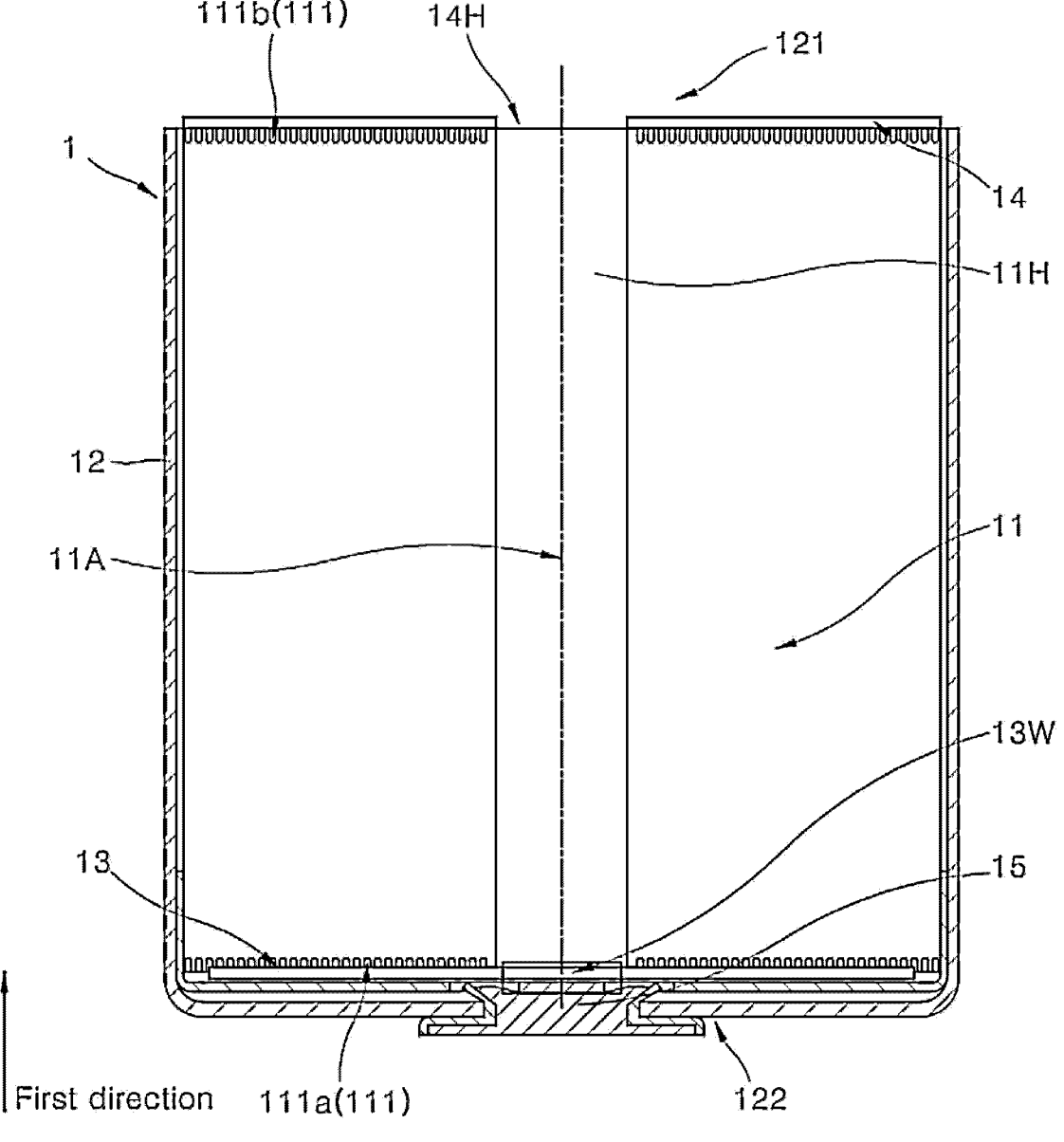

【FIG. 2】
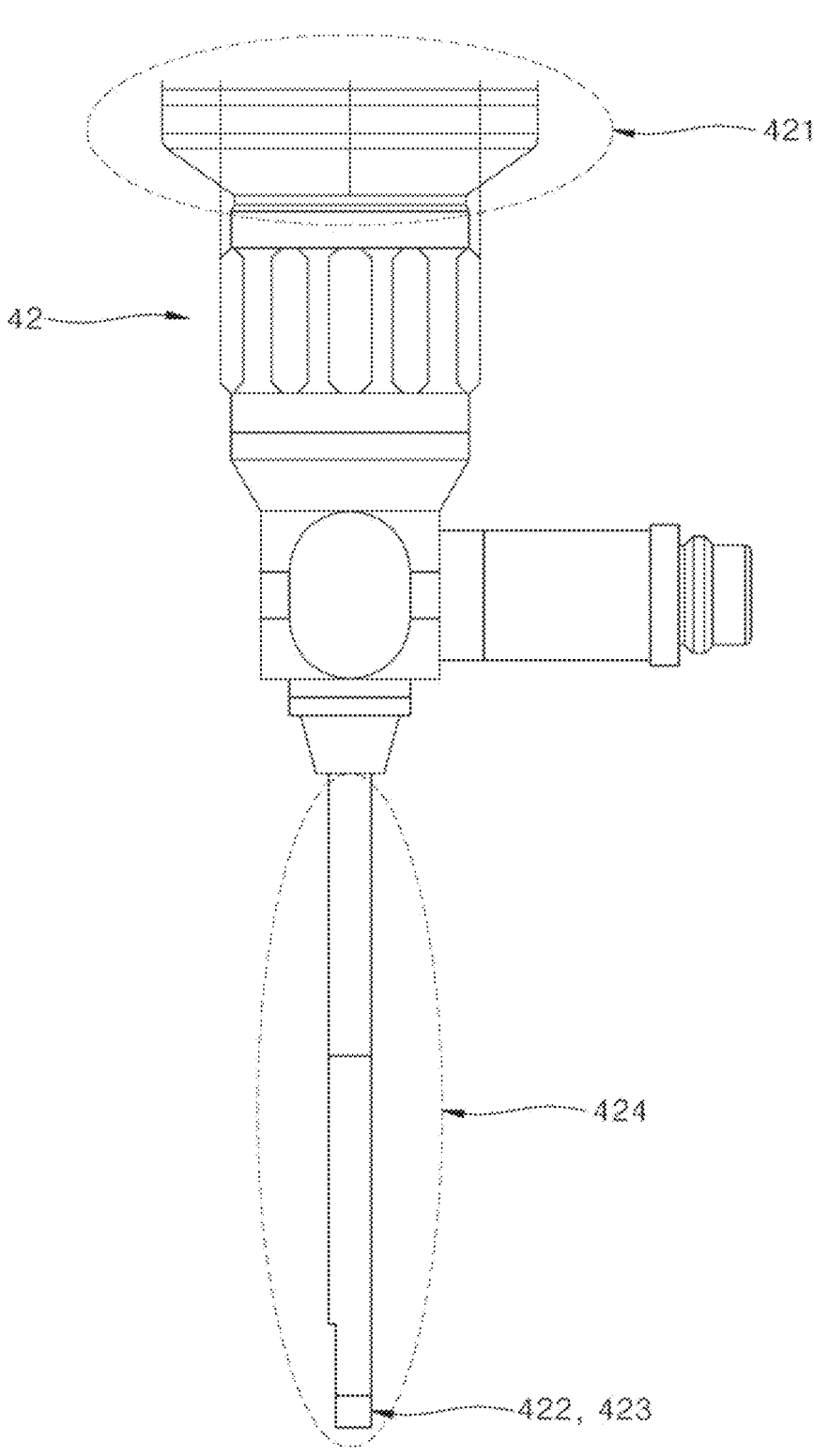

[FIG. 3]
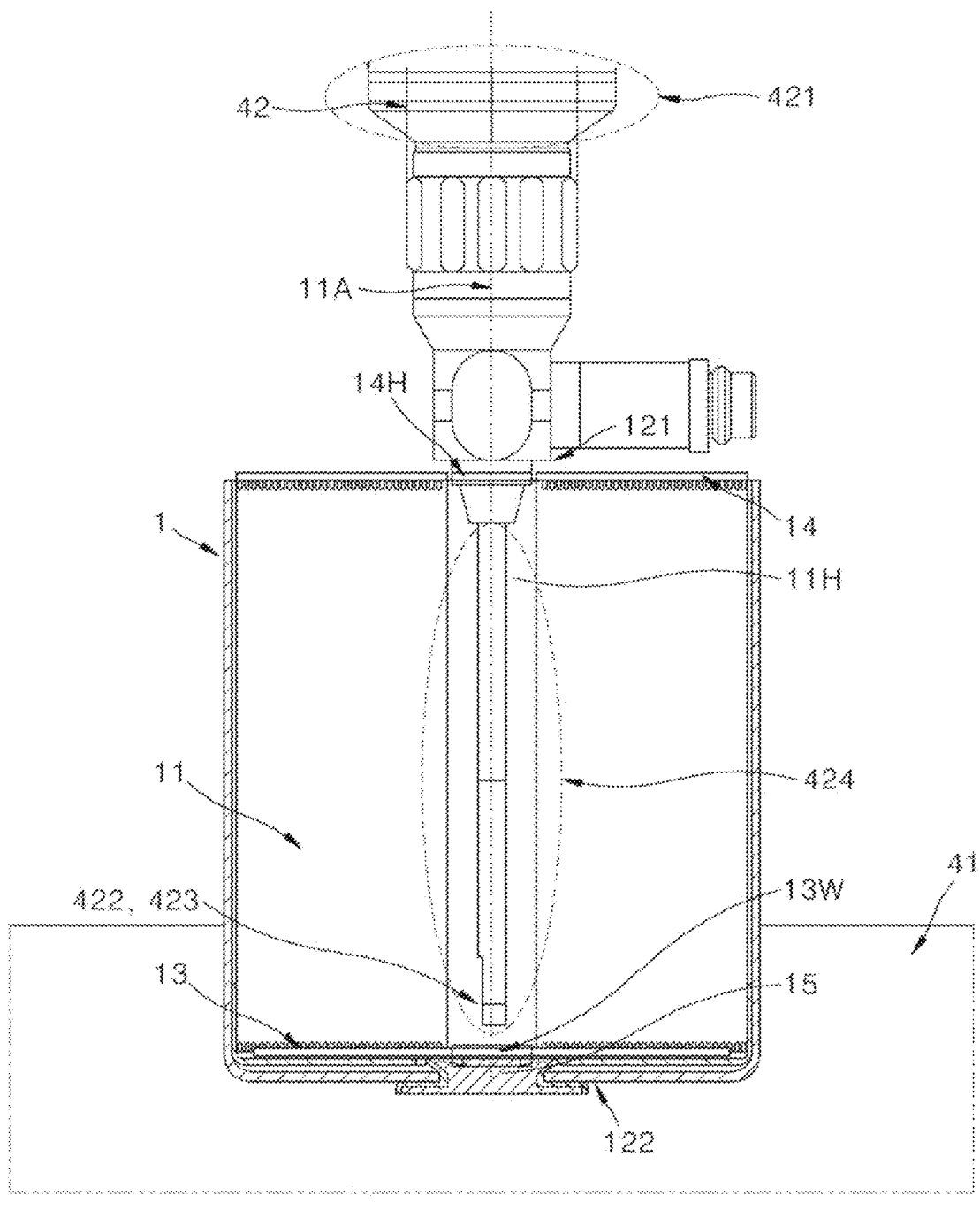

【FIG. 4】
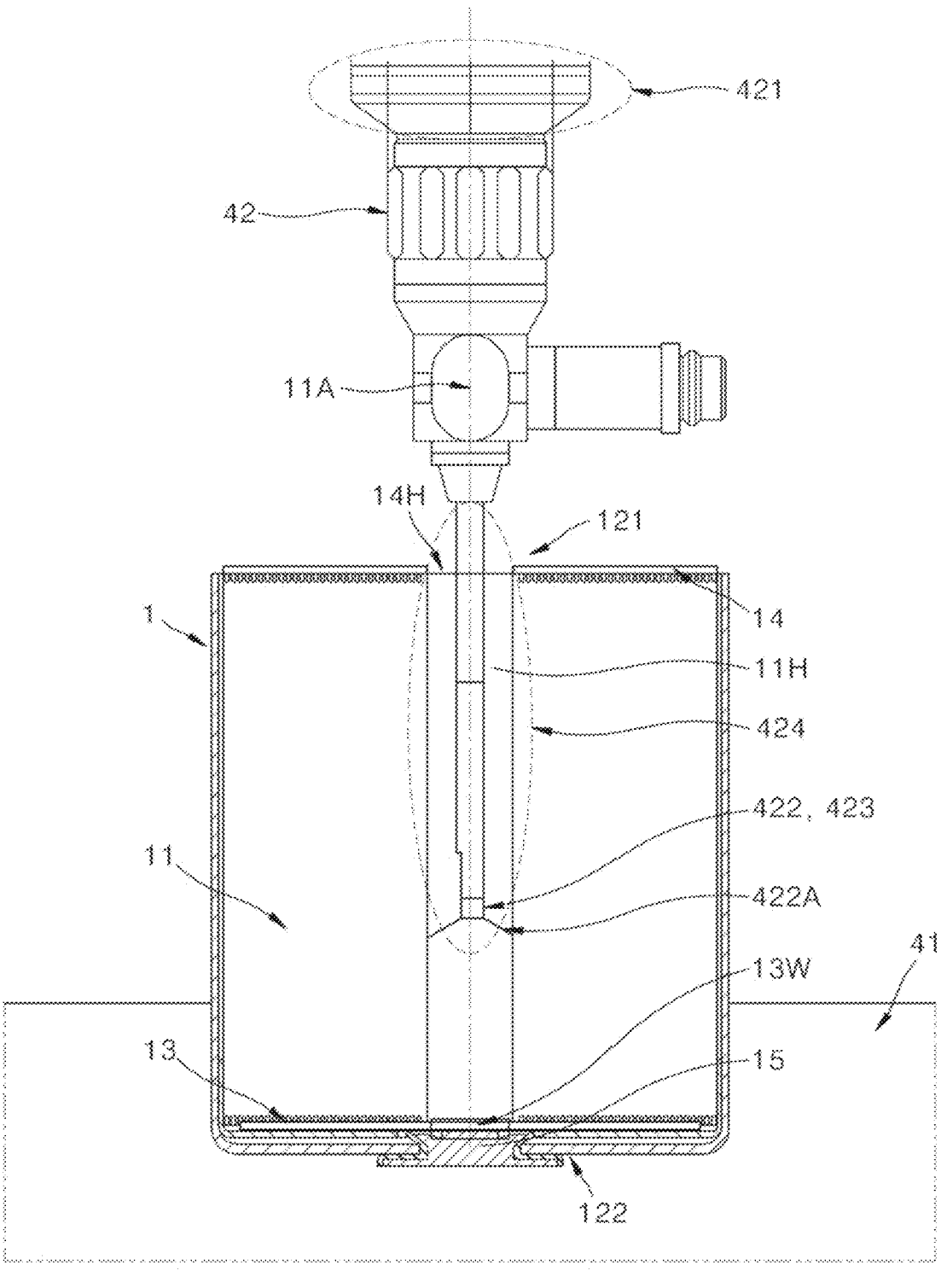

【FIG. 5】
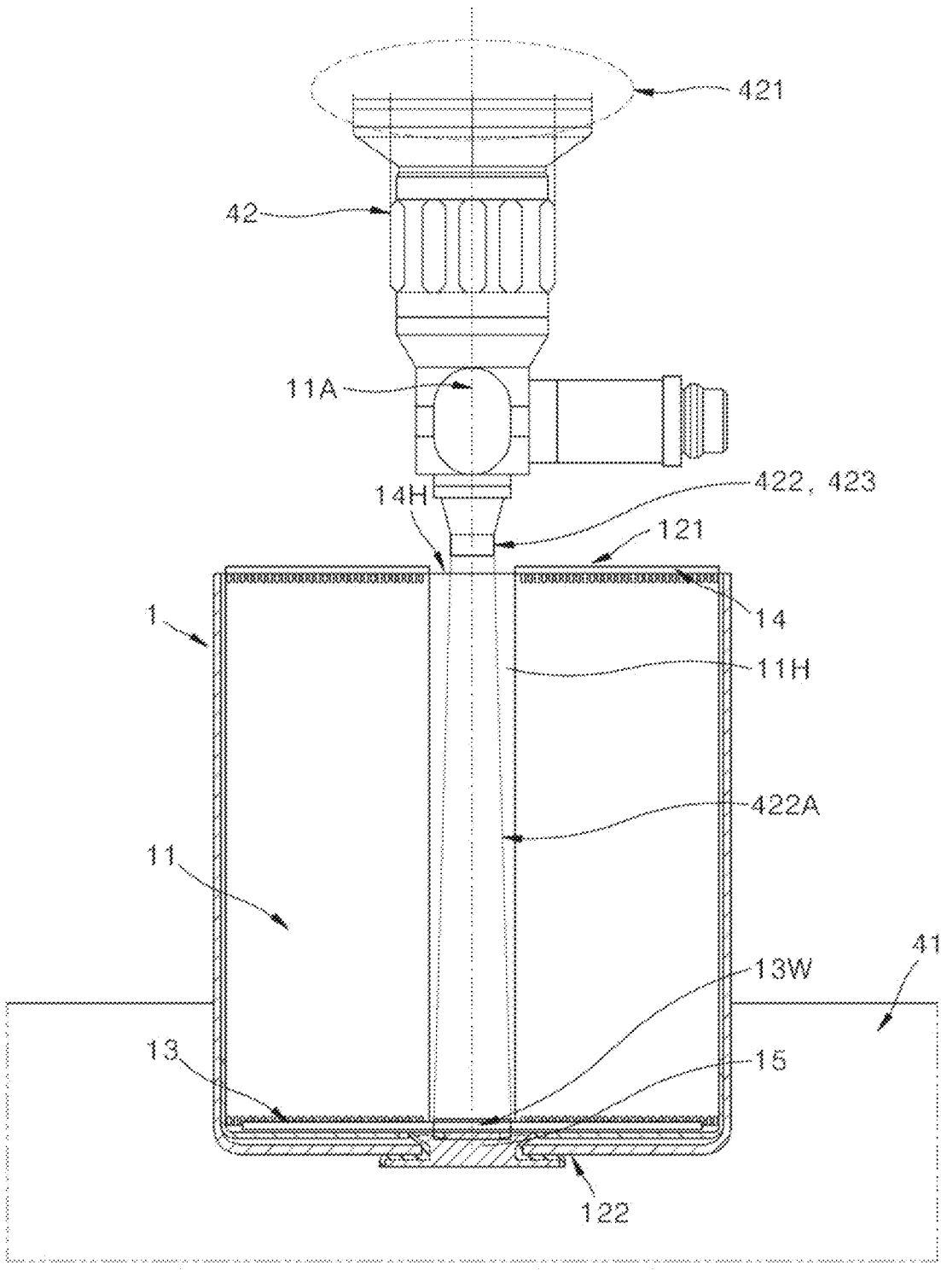

[FIG. 6]
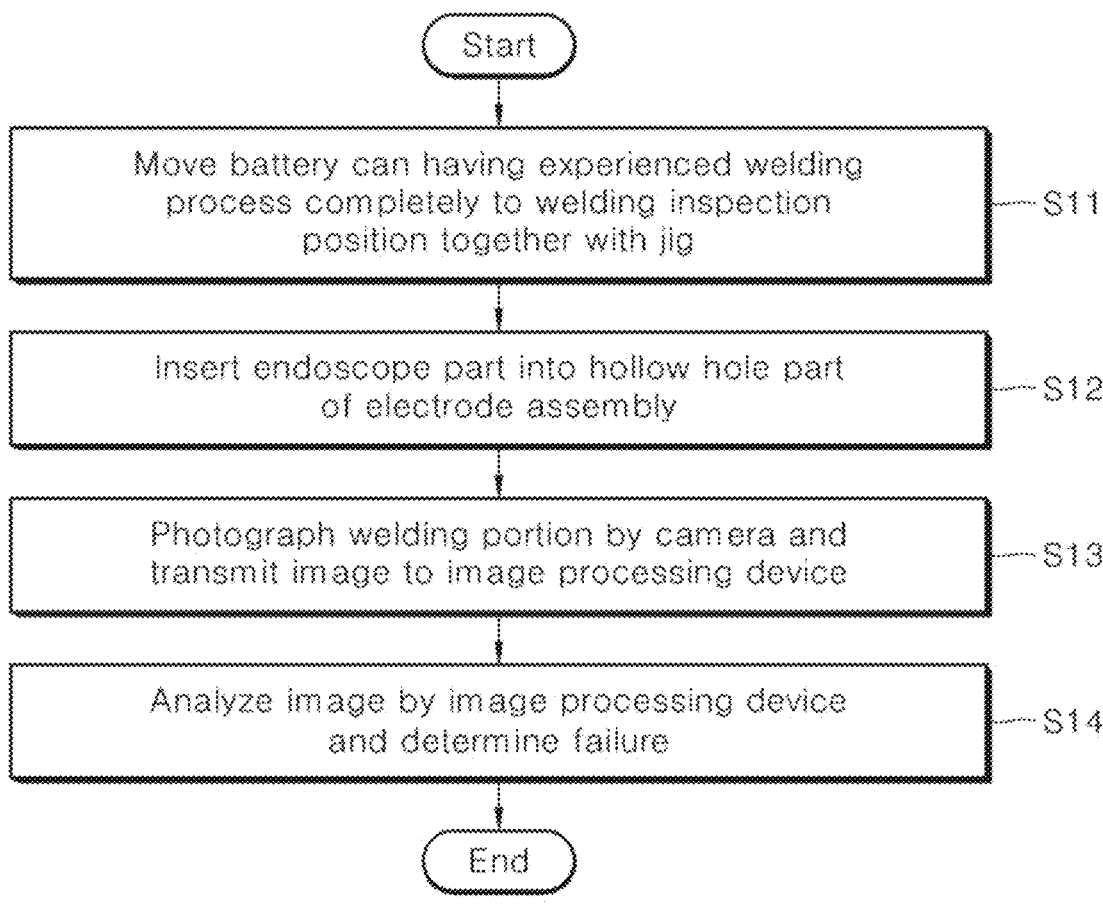

WELDING INSPECTION APPARATUS FOR INSPECTING A BATTERY CAN

TECHNICAL FIELD

This application claims priority to and the benefit of Korean Patent Application No. 10-2021-0152638 filed on Nov. 8, 2021, and Korean Patent Application No. 10-2022-0055065 filed on May 3, 2022, the disclosure of which is incorporated herein by reference in its entirety.

The present disclosure relates to a welding inspection apparatus, and in particular, an apparatus used to see a welding state in a hollow hole part of a cylindrical electrode assembly on a linear track.

BACKGROUND ART

Secondary batteries are highly applicable to various product groups, and exhibit electrical properties such as high energy density and the like. Accordingly, secondary batteries are universally applied to electric vehicles (EV) or hybrid vehicles (HEV) and the like driven by an electric driving source as well as mobile devices.

Secondary batteries not only help to reduce the consumption of fossil fuels significantly but also produce no by-products after the use of their energy. Thus, secondary batteries are hailed as an alternative energy source that protect the environment and improve energy efficiency.

Secondary batteries include a lithium-ion battery, a lithium-polymer battery, a nickel-cadmium battery, a nickel-hydrogen battery, a nickel-zinc battery and the like that are currently used. The operating voltage of such a unit secondary battery cell, i.e., a unit battery cell, is about 2.5 V to 4.5 V. When an output voltage higher than the operating voltage is required, a plurality of battery cells connects in series, to constitute a battery pack. Additionally, a plurality of battery cells connects in parallel to constitute a battery pack, depending on the charge capacity or discharge capacity required of the battery pack. The number of battery cells included in the battery packs, and the electric connection form of the battery cells can vary depending on a required output voltage and/or charge and discharge capacity.

Additionally, unit secondary battery cells include a cylindrical battery cell, a prismatic battery cell, and a pouch-type battery cell. In the case of a cylindrical battery cell, a separation layer as an insulator is interposed between an anode and a cathode, and the stack of electrodes and separation layer is wound to form a jelly roll-type electrode assembly, and the jelly roll-type electrode assembly is inserted into a battery can, to form a battery. Further, a strip-shaped electrode tab can connect to an uncoated part of each of the anode and the cathode, and electrically connects between the electrode assembly and an electrode terminal that is exposed outward. A positive electrode terminal is a cap plate of a sealing body that seals an opening of a battery can, and a negative electrode terminal is a battery can. In a cylindrical battery cell having the above-described structure, current concentrates on the strip-shaped electrode tab coupled to an anode uncoated part and/or a cathode uncoated part, causing high resistance and a large amount of heat, and deterioration in the efficiency of collecting current.

The resistance and heat generation of a small-sized cylindrical battery call having a form factor of a 18650 or 21700 battery are not a bug issue. However, in the case where the form factor increases to apply the cylindrical battery cell to an electric vehicle, a large amount of heat is generated around the electrode tab during rapid charge, and the cylindrical battery cell causes a fire.

To solve the problem, an anode uncoated part and a cathode uncoated part are respectively disposed at the upper end and the lower end of the jelly roll-type electrode assembly, and a current collection plate is welded to the uncoated parts, to manufacture a cylindrical battery cell (the so-called tab-less cylindrical battery cell) ensuring improvement in the efficiency of collecting current.

Among tab-less cylindrical battery cells, there may be a battery cell, in which the electrode assembly electrically connects to the outside, in a way that a current collection plate is welded to an uncoated part of an electrode assembly, and also welded from the inside of the battery can to an electrode terminal, which is fixed to penetrate one end portion of a battery can and protrudes out of the battery can.

FIG. 1 is a lateral cross-sectional view showing an uncoated part of an electrode assembly and a first current collection plate are welded, and then a first electrode terminal rivet-fixed to one end portion of a battery can and the first current collection plate are welded while a cylindrical battery cell is manufactured. Referring to FIG. 1, the first current collection plate 13 is welded to a first uncoated part 111*a*, and the electrode assembly 11 is accommodated in the battery can 12 in a way that a second uncoated part 111*b* faces an open part 121 of the battery can 12. The first current collection plate 13 is welded to a first electrode terminal 15 in a welding portion 13W at one end portion of the hollow hole part 11H, which is rivet-fixed in a way that penetrates the bottom surface of the battery can 12, In the case of a cylindrical battery cell having the above-described structure, the welding portion 13W can be checked only through the hollow hole part 11H. Thus, an ordinary vision camera inspection apparatus can hardly see the welding state of the welding portion 13W.

DESCRIPTION OF INVENTION

Technical Problems

The objective of the present disclosure having devised under the above-described circumstances is to provide a welding inspection apparatus and a welding inspection method that can inspect a welding state, e.g., over welding or weak welding and the like, between a current collection plate welded to the uncoated part at one side of a jelly roll-type electrode assembly that is accommodated in a cylindrical battery can having a closed surface in the end portion of one side thereof and an open part in the end portion of the other side thereof, and a an electrode terminal fixed in a way that penetrates the closed surface.

Another objective of the present disclosure is to provide a welding inspection apparatus in which in the case where the welding inspection apparatus is a vision camera, the angle of view of the lens of the vision camera can be suggested properly, to see failure caused by weld spatter on the inner circumferential surface of a hollow hole part as well as the welding state, e.g., over welding and the like, of a welding portion.

Another objective of the present disclosure is to provide a welding inspection method in which the welding inspection apparatus can be applied to a specimen on a linear track.

Yet another objective of the present disclosure is to optimize the processing in the welding inspection method that is performed on a specimen on a linear track, ensuring improvement in economical efficiency in the entire manufacturing process.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

In the present disclosure, provided is a welding inspection apparatus comprising a jig configured to support and fix a battery can as a specimen, in a way that an open part of the battery can faces in a first direction, and a camera comprising a lens that is aligned with a welding portion between a first current collection plate and a first electrode terminal, in a first direction, and an image sensor.

An electrode assembly accommodated in the battery can may have a first uncoated part and a first current collection plate welded to the first uncoated part, in the end portion of one side thereof, in the axial direction thereof, and have a second uncoated part and a second current collection plate welded to the second uncoated part, in the end portion of the other side thereof, in the axial direction thereof, and the second current collection plate may have a central hole having an inner diameter that is the same as or greater than the inner diameter of the end portion of the other side of the hollow hole part, to allow the hollow hole part of the electrode assembly to be open through the open part of the battery can.

The camera may comprise an endoscope part in one end portion thereof, and the endoscope part may be moved and inserted into the hollow hole part along a first direction and photograph the welding portion in close up.

The endoscope part may have an outer diameter less than an inner diameter of the hollow hole part.

The endoscope part may pass through the central hole of the second current collection plate and be inserted into the hollow hole part.

The endoscope part may have a lens and a lighting device at an end portion thereof, in the first direction, and the lighting device may be integrated with the lens.

The endoscope part may be inserted into the hollow hole part as the camera approaches to a specimen along the first direction, or as the jig allows a specimen itself to approach to the camera along the first direction.

The endoscope part may be provided with a sub motor enabling a parallel movement on an X-axis, a Y-axis or a Z-axis, to be aligned with the welding portion or the hollow hole part or to determine a focal point and the like, before and after the insertion. The sub motor enables a movement in any one of the three directions, a free movement in all the three directions, and the like, based on the number of cases.

The lens may be a wide-angle lens. The wide-angle lens may denote a lens having an angle of view that is wide enough for the endoscope part to photograph the inner circumferential surface of the hollow hole part in the state where the endoscope part is inserted into the hollow hole part.

The lens may be a telephoto lens. The telephoto lens may denote a lens having a focal length that is long enough to photograph the welding portion without inserting the endoscope part into the hollow hole part when the camera is provided with no endoscope part.

The camera may connect to an external image processing device, to process an image obtained by the image sensor and draw results of an inspection.

The image processing device may be a device programmed to process an image of the welding portion, obtained by the image sensor, to determine weak welding, normal welding or over welding of the welding portion, and to output an inspection determination signal.

The image processing device may be a device programmed to detect whether there is a hole caused by over welding in the welding portion, in the image of the welding portion obtained by the image sensor, to determine over welding of the welding portion, and to output an inspection determination signal.

The image processing device may be a device programmed to process an image of the inner circumferential surface of the hollow hole part, obtained by the image sensor, to determine whether weld spatter caused by welding occurs on the inner circumferential surface, and to output an inspection de termination signal.

In the present disclosure, a method of inspecting a welding state is provided and involves photographing the welding portion or the inner circumferential surface of the hollow hole part, with the welding inspection apparatus.

The welding inspection method may involve determining weak welding, normal welding or over welding of the welding portion.

The welding inspection method may involve determining whether weld spatter occurs on the inner circumferential surface of the hollow hole part. Alternatively, the welding inspection method may involve determining whether weld patter occurs, and determining weak welding, normal welding or over welding of the welding portion.

The welding inspection method may be performed on a specimen on a linear track.

In the welding inspection method on a linear track, a trigger input may be set to be provided only when data on a product is present.

In the welding inspection method on a linear track, a trigger input may be set to an inspection pass mode, in which an inspection determination signal is ignored and the trigger is always on.

In the welding inspection method on a linear track, a defect rate may be set to 200 PPM. With respect to the defect rate, tact time of the linear track may be set to 300 ms or less.

The tact time may be set to 200 ms or less, considering scan time.

Advantageous Effects

In one aspect of the present disclosure, provided is a welding inspection apparatus which comprises a camera provided with an endoscope part with a lighting device and a lens, and in which since the endoscope part is inserted into a hollow hole part of a jelly roll-type electrode assembly accommodated in a cylindrical battery can which has a closed surface in the end portion of one side thereof and has an open part in the end portion of the other side thereof, a welding state between a current collection plate welded to an uncoated part at one side of the electrode assembly, and an electrode terminal fixed in a way that penetrates the closed surface is inspected.

In another aspect, provided is a welding inspection apparatus in which the endoscope part makes a parallel movement freely.

In another aspect, provided is a welding inspection apparatus in which the endoscope part is provided with a telephoto lens to inspect the welding state of a welding portion, even though the camera is not provided with an endoscope part or inserted into the hollow hole part.

In another aspect, provided is a welding inspection apparatus that photographs the inner circumferential surface the hollow hole part of the electrode assembly to see whether weld spatter occurs.

In another aspect, provided is a welding inspection method that is performed on a specimen on a linear track with the welding inspection apparatus.

In yet another aspect, provided is a welding inspection method in which the welding inspection on a linear track is performed for tact time of 200 ms or less.

In addition to the above effects, various other effects can be produced according to the preset disclosure, and description of the effects is provided with reference to each embodiment or description of effects predicted by one having ordinary skill in the art readily and the like are omitted.

BRIEF DESCRIPTION OF DRAWINGS

FIG. 1 is a cross-sectional view showing a cylindrical battery cell during a manufacturing process in which a first electrode uncoated part of a jelly-roll-type electrode assembly is welded to a first current collection plate and in which the first current collection plate is welded to a first electrode terminal.

FIG. 2 is a schematic view showing a camera provided with an endoscope part that is inserted into a hollow hole part of an electrode assembly, to inspect a welding state between a first current collection plate and a first electrode terminal.

FIG. 3 is a schematic view showing that a camera provided with an endoscope part is inserted into a hollow hole part of an electrode assembly.

FIG. 4 is a schematic view showing that a cameral provided with an endoscope part and a wide-angle lens is inserted into a hollow hole part of an electrode assembly, and photographs the inner circumferential surface of the hollow hole part.

FIG. 5 is a schematic view showing that a camera provided with a telephoto lens photographs a welding portion without being inserted into an electrode assembly.

FIG. 6 is a time-series flowchart showing a method of inspecting a welding state, with a welding inspection apparatus having an endoscope part, on a linear track.

DESCRIPTION OF REFERENCE NUMERALS

1: Battery cell (Cylindrical battery cell)
11: Electrode assembly
11A: Central axis
11H: Hollow hole part
111: Uncoated part
111*a*: First uncoated part
111*b*: Second uncoated part
12: Battery can
121: Open part
122: Closed surface
13: First current collection plate
13W: Welding portion
14: Second current collection plate
14H: Central hole
15: First electrode terminal
2: Linear track
3: Welding device
4: Welding inspection apparatus

41: Jig
42: Camera
421: Image sensor
422: Lens
422A: Angle of view
423: Lighting device
424: Endoscope part
P: Battery pack
V: Vehicle

DETAILED DESCRIPTION OF EXEMPLARY EMBODIMENTS

The above-described aspects, features and advantages are specifically described hereafter with reference to the accompanying drawings such that one having ordinary skill in the art to which the present disclosure pertains can embody the technical spirit of the disclosure easily. In the disclosure, detailed description of known technologies in relation to the subject matter of disclosure is omitted if it is deemed to make the gist of the disclosure unnecessarily vague. Hereafter, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component, unless stated to the contrary.

Throughout the disclosure, each component can be provided as a single one or a plurality of ones, unless explicitly stated to the contrary.

When any one component is described as being "in the upper portion (or lower portion)" or "on (or under)" another component, any one component can be directly on (or under) another component, but an additional component can be interposed between any one component and another component on (or under) any one component.

When any one component is described as being "connected", "coupled", or "connected" to another component, any one component can be directly connected or coupled to another component, but an additional component can be "interposed" between the two components or the two components can be "connected", "coupled", or "connected" by an additional component.

The singular forms "a", "an" and "the" are intended to include the plural forms as well, unless explicitly indicated otherwise. It is to be understood that the terms "comprise" or "include" and the like, set forth herein, are not interpreted as necessarily including all the stated components or steps but can be interpreted as excluding some of the stated components or steps or can be interpreted as including additional components or steps.

Throughout the disclosure, the phrase "A and/or B" as used herein can denote A, B or A and B, and the phrase "C to D" can denote C or greater and D or less, unless stated to the contrary.

In the present disclosure, a direction (Y) along the lengthwise direction of the winding shaft of an electrode assembly wound in a jelly roll shape is referred to an axial direction or a widthwise direction. Additionally, a direction (X) in which the winding shaft is surrounded is referred to as a circumferential direction or a perimeter direction. Further, a direction (Z) closer to the winding shaft or farther from the winding shaft is referred to as a radius direction or a radial direction. Specifically, a direction closer to the winding shaft is referred to as a centripetal direction, and a direction farther from the winding shaft is referred to as a centrifugal direction.

In the present disclosure, provided is a welding inspection apparatus and a welding inspection method that are used during manufacturing of a cylindrical battery cell, in particular, a tab-less cylindrical battery cell comprising a jelly roll-type electrode assembly 11 in which anode plate, cathode plate, and separation layers interposed by the electrode plates are stacked and are wound while surrounding the center of the winding. The inspection apparatus and the inspection method can be adapted and applied not only to the manufacturing process of the tab-less cylindrical battery cell but also to the inspection of a welding state of a specimen having a long narrow hollow hole part described hereafter and a welding portion at one end of the inner side of the hollow hole part, by one having ordinary skill in the art.

Hereafter, exemplary embodiments of the present invention are described with reference to the accompanying drawings.

FIG. 1 is a cross-sectional view showing a cylindrical battery cell during a manufacturing process. Referring to FIG. 1, the cylindrical battery cell comprises a jelly roll-type electrode assembly 11, and a first current collection plate 13 and a second current collection plate 14 welded respectively to a first electrode uncoated part 111 and a second electrode uncoated part 111 that are provided in each end portion of the electrode assembly 11 in an axial direction, which are accommodated in a cylindrical battery can 12 that has a closed surface 122 in the end portion of one side thereof in the axial direction, and an open part 121 in the end portion of the other side thereof in the axial direction, and a first electrode terminal 15 is provided in the central portion of the closed surface 122 and penetrates and is fixed to the closed surface 122. The first current collection plate 13 is welded to the first electrode terminal 15 from the inside of the battery can 12, through a hollow hole part 11H that is elongated while passing through a central axis 11A of the electrode assembly 11, and forms a welding portion 13W.

A weld between the first current collection plate 13 and the first electrode terminal 15 can be performed by inserting a welding rod and a guide, in order not to damage a separation layer and a core (a tube-type member disposed at the center of windings at a jelly roll-type electrode assembly) that can be disposed on the inner surface of the hollow hole part 11H. However, a welding method is not limited to the above-mentioned method. Certainly, various types of welding such as laser welding, resistance welding and the like is applicable.

The second current collection plate 14 is provide with a central hole 14H having an inner diameter that is the same as or greater than the inner diameter of an open part in the end portion of the other side of the hollow hole part 11H in the axial direction thereof. Accordingly, even after the second current collection plate 14 is welded, the hollow hole part 11H may be open toward the other side of the axial direction thereof. Though described hereafter, since the central hole 14H is provided, a welding state between the first current collection plate 13 and the first electrode terminal 15 can be inspected, even in the state where the second current collection plate 14 is welded.

The first electrode terminal 15 may be insulated by the battery can 12 and a gasket and the like. Additionally, later, the second current collection plate 14 can connect to the battery can 12 electrically, and at this time, the first electrode terminal 15 may be a terminal that connects the cathode or the anode of the electrode assembly 11 to the outside, and the battery can 12 may be a terminal that connects the anode or the cathode of the electrode assembly 11 to the outside.

A specimen of the welding inspection apparatus or the welding inspection method according to the present disclosure may be completely assembled or welded in a way that the specimen comprises the battery can 12, the electrode assembly 11, the first current collection plate 13, and the first electrode terminal 15. Further, in the case where the second current collection plate 14 has a central hole 14H, the end portion of the other side of the hollow hole part 11H in the axial direction thereof is open, even in the state where the second current collection plate 14 is completely assembled, making it possible to take an optical approach, i.e., photograph the welding portion 13W. Thus, an welding inspection can proceed in the state where the second current collection plate 14 is completely assembled.

FIG. 2 is a schematic view showing a camera 42 being included in a welding inspection apparatus of another embodiment and photographing a welding portion 13W, and being provided with an endoscope part 424. Referring to FIG. 2, the camera 42 necessarily comprises a lens 422 and an image sensor 421, and further comprises an endoscope part 424 and/or a lighting device 423.

The image sensor 421 obtains an image through light coming in from the lens 422, and an image obtained by the image sensor 421 may be transmitted to an image processing device that connects to the outside of the camera 42. The image processing device may be a device programmed to analyze the image obtained by the image sensor 421 and determine the welding state of the welding portion 13W.

The welding state may denote weak welding, normal welding or over welding. The image processing device may be a device that can analyze the image of the inner circumferential surface of the hollow hole part 11H, obtained by the image sensor 421, and determine whether weld spatter occurs on the inner circumferential surface of the hollow hole part 11H, in the case where the camera 42 can photographs the inner circumferential surface of the hollow hole part 11H of the electrode assembly 11.

As described hereafter, the endoscope part 424 may be an instrument that can be moved and inserted into the hollow hole part 11H of the electrode assembly 11, and photograph the welding portion 13W.

The lighting device 423 may be disposed near the lens 422 to radiate light to a photographing portion of the lens 422, and as illustrated in FIG. 2, may be integrated with the lens 422. The lighting device 423 may be disposed in a proper position, in a proper direction, to radiate light into the hollow hole part 11H and light up the welding portion 13W. In the case where the camera is provided with the endoscope part 424, the lighting device 423 may be disposed in the end portion of the endoscope part 424.

FIG. 3 is a schematic view showing that a camera 42 provided with an endoscope part 424 in one embodiment is inserted into a hollow hole part 11H of an electrode assembly 11. Referring to FIG. 3, in the embodiment, a jig 41 fixes the battery can 12 in a way that the open part 121 faces in a first direction, and the camera 42 with the endoscope part 424 is disposed at the open part 121 side of the battery can 12, in the state where the lens 422 disposed in the end portion of the endoscope part 424, and the image sensor 421 disposed at the main body side of the camera 42 are aligned from the welding portion 13W, in the first direction.

The endoscope part 424 may be elongated along the central axis 11A of the electrode assembly 11, allow the lens 422 to approach to the welding portion 13W, and be inserted into the hollow hole part 11H. As the endoscope part 424 is inserted into the hollow hole part 11H, the camera 42 may photograph the welding portion 13W through the lens 422 provided in the end portion of the endoscope part 424.

To be inserted into the hollow hole part 11H, the endoscope part 424 may have an outer diameter that is less than the inner diameter of the hollow hole part 11H. The endoscope part 424 may also pass through the central hole 14H provided at the second current collection plate 14 and be inserted into the hollow hole part 11H, and to this end, the endoscope part 424 may have an outer diameter that is less than the inner diameter of the second current collection plate 14.

The endoscope part 424 may move in various ways to be inserted into the hollow hole part 11H. The camera 42, as a whole, may approach and move to the welding portion 13W, for example. Alternatively, in the state where the camera 42 is fixed, the endoscope part 424 may only be elongated independently and approach to the welding portion 13W. Alternatively, the jig 41 may move the battery can itself along the first direction, such that the endoscope part 424 is inserted into the hollow hole part 11H.

At this time, the lighting device 423 may be provided in the end portion of the endoscope part 424, and may be integrated with the lens 422.

The endoscope part 424 may be provided with a sub motor to move freely and parallelly on the X-axis, the Y-axis and/or the Z-axis, before and after the endoscope part 424 is inserted into the hollow hole part 11H or while the endoscope part 424 is inserted into the hollow hole part 11H. The sub motor may be used to finely adjust a photographing portion or a focal point and the like of the camera 42.

An image obtained by the image sensor 421 is transmitted to the image processing device through the lens 422, to determine the welding state, i.e., weak welding, normal welding or over welding, of the welding portion 13W. The image processing device may be programmed to analyze an image that is obtained by the image sensor 421 and transmitted, and to determine the welding state. For example, the image processing device may be programmed to detect whether there is a hole caused by over welding, in the image of the welding portion 13W, which is obtained by the image sensor 421 and transmitted, to determine whether the welding portion 13W is overly welded. That is, the image processing device may be a sort of vision inspection device.

FIG. 4 is a schematic view showing that a cameral further provided with a wide-angle lens in FIG. 3 is inserted into a hollow hole part of an electrode assembly, and photographs the inner circumferential surface of the hollow hole part. Referring to FIG. 4, in the embodiment, the lens provided in the end portion of the endoscope part 424 may be wide-angle lens. The wide-angle lens may denote a lens 422 having an angle of view 422A that is wide enough for the camera 42 to photograph the inner circumferential surface of the hollow hole part 11H.

The image obtained by the image sensor 421 through the lens 422 is transmitted to the image processing device, to determine whether weld spatter occurs on the inner circumferential surface of the hollow hole part 11H. The image processing device may be programmed to analyze an image that is obtained by the image sensor 421 and transmitted, and to determine whether weld spatter occurs. For example, the image processing device may be programmed to identify whether a spatter pattern caused by welding is created in the image of the inner circumferential surface of the hollow hole part 11H, which is obtained by the image sensor 421 and transmitted, and to determine whether weld spatter occurs.

The inspection of the welding state and the inspection of whether weld spatter occurs may be performed by a single welding inspection apparatus comprising the endoscope part 424 that is provided with the wide-angle lens 422 in the end portion of the endoscope part 424, at the same time. At this time, the image processing device may be programmed to determine the welding state and whether weld spatter occurs, at the same time.

FIG. 5 is a schematic view showing that a camera provided with a telephoto lens in yet another embodiment photographs a welding portion without being inserted into an electrode assembly. Referring to FIG. 5, in the embodiment, the jig 41 fixes the battery can 12 in a way that the open part 121 of the battery can 12 faces in the first direction. The camera 42 may be disposed in a way that the lens 422 and the image sensor 421 are aligned in the first direction, with respect to the welding portion 13W. At this time, the camera 42 may not be provided with the endoscope part 424, and the lens 422 may not be inserted into the hollow hole part 11H.

At this time, the lens 422 may be a telephoto lens. The telephoto lens may denote a lens that has a narrow angle of view and a long focal length, to photograph the welding portion 13W, without being inserted into the hollow hole part 11H. The camera 42 may be provided with a lighting device 423 that is adjacent to the lens 422, and the lighting device 423 may be integrated with the lens 422.

An image obtained by the image sensor 421 through the lens 422 is transmitted to the image processing device to determine the welding state, i.e., weak welding, normal welding or over welding, of the welding portion 13W. The image processing device may be programmed to analyze the image that is obtained by the image sensor 421 and transmitted and to determine the welding state. For example, the image processing device may be programmed to detect whether there is a hole caused by over welding, in an image of the welding portion 13W, which is obtained by the image sensor 421 and transmitted, and to determine whether the welding portion is overly welded.

A specimen on a linear track may be inspected by the welding inspection apparatus. The linear track may be a linear track on which the tab-less cylindrical battery cell is manufactured. On the linear track, the specimen experiences a welding process performed by a welding device, before moving to the welding inspection apparatus. The welding process may involve a weld between the first current collection plate 13 and the first electrode terminal 15, a weld between the first current collection plate 13 and the first uncoated part 111*a*, and/or the second current collection plate 14 and the second uncoated part 111*b*.

FIG. 6 is a time-series flowchart showing a method of inspecting the welding state of a specimen on a linear track, with a welding inspection apparatus comprising an endoscope part 424 in one embodiment. Hereafter, the welding inspection method is described with reference to FIGS. 3 to 6.

Together with a jig 41, a battery can 12 having experienced a welding process moves to a position for a welding inspection, on the linear track (S11). In the position for a welding inspection, an open part 121 of the battery can 12 may face in the first direction with the help of the jig 41, and a lens 422 and an image sensor in a camera 42 of the welding inspection apparatus may be aligned and fixed in the first direction along a central axis 11A of an electrode assembly 11, from a welding portion 13W between a first current collection plate 13 and a first electrode terminal 15.

An endoscope part 424 is inserted into a hollow hole part 11H of the electrode assembly 11 (S12). The endoscope part 424 may be elongated to the inside of the hollow hole part 11H from the main body of the camera 42, along the central axis 11A of the electrode assembly 11. At this time, as the welding inspection apparatus or the camera 42 moves and approaches to the welding portion entirely, the endoscope part 424 may be inserted into the hollow hole part 11H, or as the endoscope part 424 only is independently elongated to allow the lens 422 to approach to the welding portion 13W or as the jig 41 moves to allow the battery can 12 to approach to the lens 422, the endoscope part 424 may be inserted into the hollow hole part 11H. The lens 422 may be provided in the end portion of the endoscope part 424, and a lighting device 423 may be provided near the lens 422 or integrated with the lens 422. The above step (S12) may be omitted in a welding inspection method using a welding inspection apparatus provided with a telephoto lens.

The camera 42 photographs the welding portion 13W and transmits an image of the welding portion 13W to the image processing device (S13). In the photographing process, the image of the welding portion 13W is obtained by an image sensor 421 through the lens 422. In the above process, a welding inspection method using a welding inspection apparatus provided with a wide-angle lens may involve photographing the welding portion 13W and the inner circumferential surface of the hollow hole part 11H at the same time, to see whether weld spatter occurs.

The image processing device analyzes the image and determines failure (S13). The image processing device may be programmed to analyze the image, which is obtained by the image sensor 421 and transmitted, and to determine failure. That is, the image processing device may be programmed to analyze the image of the welding portion 13W and to determine weak welding, normal welding or over welding. For example, the image processing device may be programmed to detect whether there is a hole caused by over welding, in the image of the welding portion 13W, and to determine over welding. In the above welding inspection method, the welding inspection apparatus provided with a wide-angle lens may be programmed to determine the welding state of the welding portion 13W and whether weld spatter occurs on the inner circumferential surface of the hollow hole part 11H, at the same time.

In the welding inspection method on a linear track, a trigger input may be set to be provided only when data on a product is present, and may also be set to an inspection pass mode in which an inspection determination signal is ignored may be set in the state where a trigger is always on.

In the welding inspection method on the linear track, a defect rate may be set to 200 PPM. With respect to the defect rate, the tact time of the linear track may be set to 300 ms or less. The tact time may also be set to 200 ms or less, considering scan time.

It should be understood that the described embodiments are illustrative in all respects and not restrictive, and the scope of the present invention will be indicated by the following claims rather than the described detailed description. And the meaning and scope of the claims to be described later, as well as all changes and modifications derived from the equivalent concept should be interpreted as being included in the scope of the present invention.

The embodiments are described above with reference to a number of illustrative embodiments thereof. However, embodiments are not limited to the embodiments and drawings set forth herein, and numerous other modifications and embodiments can be drawn by one skilled in the art within the technical scope of the disclosure. Further, the effects and predictable effects based on the configurations in the disclosure are to be included within the scope of the disclosure though not explicitly described in the description of the embodiments.

The invention claimed is:

1. A welding inspection apparatus for inspecting a welding portion between a first electrode terminal being fixed to a closed surface of a battery can, and a first current collection plate of an electrode assembly being accommodated in a battery can, the welding inspection apparatus comprising:
   a jig configured to support the battery can such that an open part of the battery can faces in a first direction; and
   a camera being disposed to face the open part, the camera comprising:
      an image sensor configured to obtain an image; and
      a lens being disposed between the image sensor and the welding portion such that a focal point of the image concentrates on the image sensor,
   wherein the jig supports the electrode assembly such that a central axis of the electrode assembly is parallel with the first direction,
   wherein the image sensor and the lens are aligned with a hollow hole part of the electrode assembly, the hollow hole part being elongated along the central axis of the electrode axis in the first direction, and
   wherein the camera is configured to extend into the battery can.

2. The welding inspection apparatus of claim 1, wherein the camera further comprises an endoscope part having an outer diameter that is less than an inner diameter of the hollow hole part such that the endoscope part is configured to be inserted into the hollow hole part along the first direction to approach the welding portion, and
   wherein the endoscope part includes:
      the lens at an end portion thereof in the first direction; and
      a lighting device at the end portion.

3. The welding inspection apparatus of claim 2, wherein the lighting device is integrated with the lens.

4. The welding inspection apparatus of claim 2, wherein the endoscope part is provided with a sub motor to move freely along an X-axis, a Y-axis and a Z-axis.

5. The welding inspection apparatus of claim 1, wherein the lens has a long focal length to photograph the welding portion such that the lens is not inserted into the hollow hole part.

6. The welding inspection apparatus of claim 2, wherein the lens has a wide angle of view to see weld spatter on an inner circumferential surface of the hollow hole part.

7. A welding inspection method for inspecting a welding portion between a first electrode terminal being fixed to a closed surface of a battery can, and a first current collection plate of an electrode assembly being accommodated in a battery can, the welding inspection method comprising:
   using the welding inspection apparatus of claim 1 to obtain an image of the welding portion, and
   analyzing the image of the welding portion to determine whether the welding portion is defective.

8. The welding inspection method of claim 7, wherein the battery can is supported on a linear track.

9. The welding inspection method of claim 8, wherein the welding inspection method is performed within 300 ms or less.

10. The welding inspection method of claim 8, wherein the welding inspection method is performed within 200 ms or less.

11. A welding inspection method for inspecting a welding portion between a first electrode terminal being fixed to a closed surface of a battery can, and a first current collection plate of an electrode assembly being accommodated in a battery can, the welding inspection method comprising:

using the welding inspection apparatus of claim 6 to obtain an image of the inner circumferential surface of the hollow hole part; and analyzing the image of the inner circumferential surface of the hollow hole part to see failure caused by weld spatter.

12. The welding inspection method of claim 11, wherein the battery can is supported on a linear track.

13. The welding inspection method of claim 12, wherein the welding inspection method is performed within 300 ms or less.

14. The welding inspection method of claim 12, wherein the welding inspection method is performed within 200 ms or less.

15. The welding inspection apparatus of claim 3, wherein the lens has a wide angle of view to see weld spatter on an inner circumferential surface of the hollow hole part.

16. The welding inspection apparatus of claim 4, wherein the lens has a wide angle of view to see weld spatter on an inner circumferential surface of the hollow hole part.

17. The welding inspection apparatus of claim 1, wherein the jig comprises a recess in a first surface for supporting the battery can, and wherein an end of the camera extends below the first surface.

* * * * *